United States Patent [19]
Corghi

[11] Patent Number: 5,489,979
[45] Date of Patent: Feb. 6, 1996

[54] SYSTEM FOR MEASURING THE CHARACTERISTIC ATTITUDE ANGLES OF THE WHEELS OF AN AUTOMOBILE FRAME, AND RELATIVE MEASUREMENT MEANS

[75] Inventor: Remo Corghi, Correggio, Italy

[73] Assignee: Corghi S.p.A., Correggio, Italy

[21] Appl. No.: 180,388

[22] Filed: Jan. 12, 1994

[30] Foreign Application Priority Data

Feb. 16, 1993 [IT] Italy .................................. RE93A0012

[51] Int. Cl.⁶ .............................. G01B 11/26; G01B 5/24
[52] U.S. Cl. .................. 356/139.09; 356/141.3; 33/203.15; 33/203.18; 33/288
[58] Field of Search .................... 33/288, 203.15, 33/203.18; 356/139.09, 141.3, 141.1, 152.1, 155, 3.1, 3.11, 3.12, 4.03

[56] References Cited

U.S. PATENT DOCUMENTS 4,383,370  5/1983  Van Blerk et al. ................ 33/203.18
5,018,853  5/1991  Hechel et al. ........................ 356/155
5,208,647  5/1993  Longa et al. .

*Primary Examiner*—Stephen C. Buczinski
*Attorney, Agent, or Firm*—Birch, Stewart, Kolasch & Birch

[57] ABSTRACT

A system for measuring the characteristic attitude angles of the wheels of an automobile frame utilizing optical sensors positioned on the wheels of the automobile frame to feed data to a central processor arranged to convert them into angular values, and four identical measurement devices fixed in mutually symmetrical arrangement to the wheels of the automobile frame in such a manner as to interact with the devices positioned on the adjacent wheels, each device comprising two identical measurement units positioned in mutually perpendicular vertical planes and each comprising angle measurement means positioned vertically and horizontally, having a single common reading unit, the angle measurement means having a light source directed towards a diaphragm, downstream of which there are located, in succession a cylindrical converging lens and a reading unit consisting of CCD-type optical sensors perpendicular to the axis of the lens, downstream of which there is a container for liquid of high refractive power through which the light plane originating from the source is refracted onto the optical sensors.

3 Claims, 3 Drawing Sheets

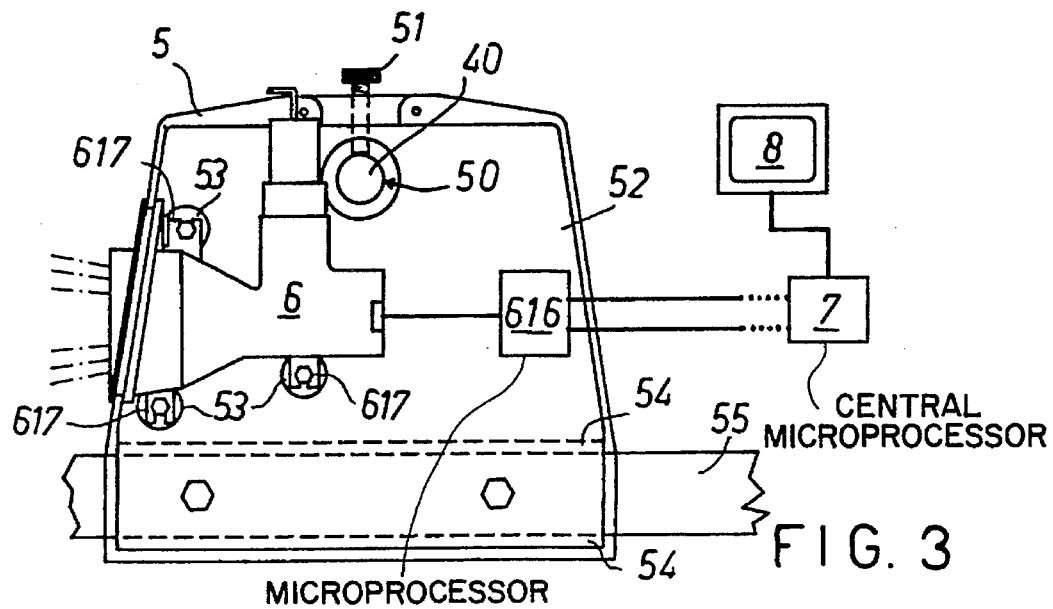
FIG. 3
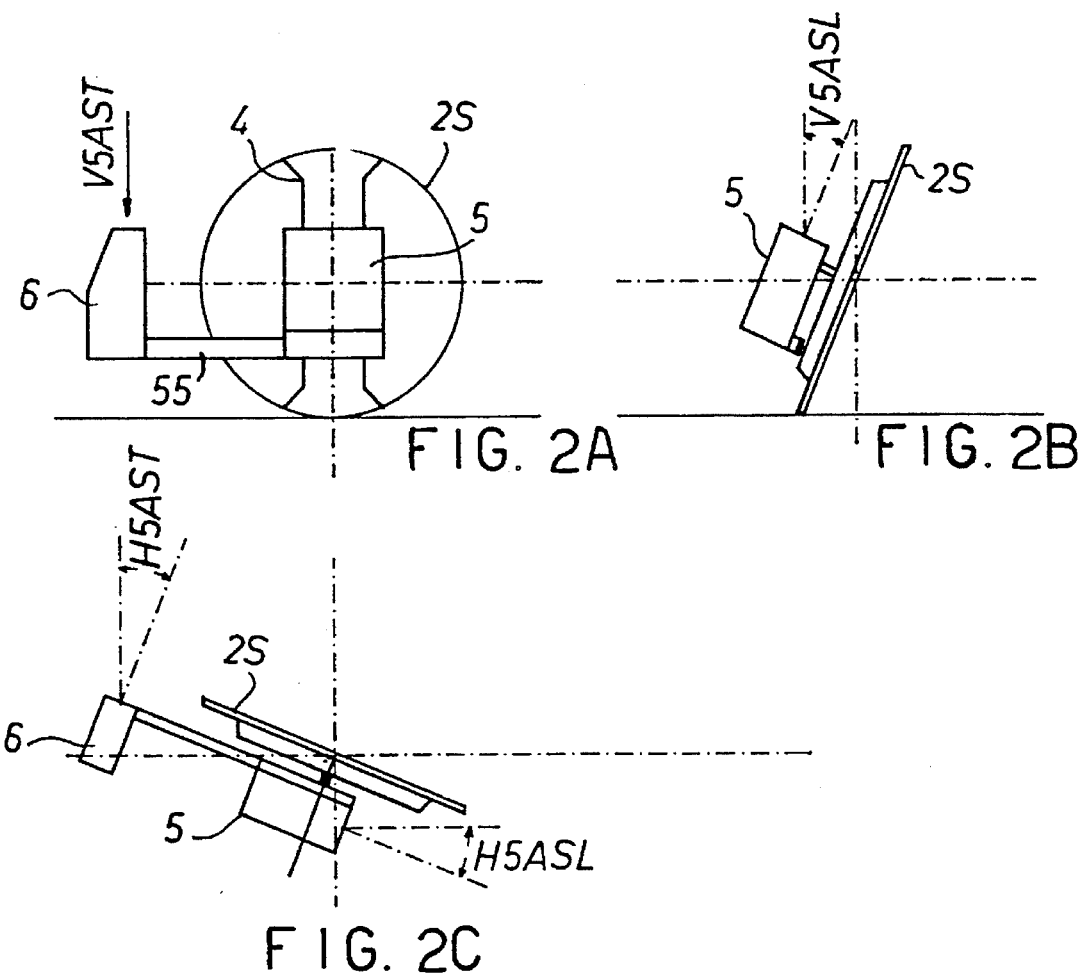
FIG. 2A   FIG. 2B
FIG. 2C 5,489,979

SYSTEM FOR MEASURING THE CHARACTERISTIC ATTITUDE ANGLES OF THE WHEELS OF AN AUTOMOBILE FRAME, AND RELATIVE MEASUREMENT MEANS

BACKGROUND OF THE INVENTION

The correct geometrical configuration of a automobile frame provided with wheels is achieved by measuring and correcting the position of each wheel relative to the others, and relative to the longitudinal and transverse axes of the frame. The whole of the angles defining the wheel positions is called the attitude of the vehicle.

Each wheel position is defined by a certain number of characteristic angles well known to the expert of the art, which are measured in known manner by goniometers or angle transducers fixed to a wheel rim and interacting with analogous instruments fixed to the rims of the two closest wheels in the transverse and longitudinal directions.

Interaction between said goniometers or angle transducers can be achieved either mechanically by wires or springs, or by electrical or optical means.

Among the most advanced of the known goniometers or angle transducers are illustrated in U.S. Pat. Nos. 4,341,021 in the name of BEISSBARTH and 4,302,104 in the name of HUNTER.

The instruments described and illustrated in said patents are intended to be applied in a total number of at least six to the wheel rims of an automobile frame and to mutually cooperate to identify the convergence angles of the wheels of an automobile frame and the angles between those wheels on one and the same side, deriving from the wheel track difference.

By subjecting said angles to known calculation systems, the characteristic attitude angles of the wheels can be obtained, namely:

right, left and total front convergence right, left and total rear convergence front wheel misalignment front and rear wheel line of thrust convergence angles to the thrust line and/or frame geometrical axis.

For better understanding, the aforesaid quantities are defined as follows.

The geometrical axis of the automobile frame is the axis passing through the centre points of the frame front and rear axles.

The frame thrust axis is the axis defined by the bisector of the angle formed by extending the rear wheel equatorial planes.

The front wheel misalignment is the angle between the straight line joining the centres of the front wheels and a straight line perpendicular to the geometrical axis.

The front and rear total convergence is the angle formed between the extension of the equatorial planes of the respective front or rear wheels.

However notwithstanding the sophisticated calculation systems available for processing the effected measurements, the known art is deficient in the sense of not allowing complete and immediate data acquisition.

In this respect, using known instruments and measurement-systems it is not possible to measure the automobile frame wheel tracks or mutually integrate the characteristic attitude angles.

Moreover it is not possible to obtain for all wheel positions the data relative to geometrical position defects between the wheel rotational axis and the wheel geometrical centre or any coaxiality error between the actual wheel rotational axis and its geometrical axis, as required for subsequent calculations.

It is also difficult to calculate the variation in the attitude angles as a function of the steering angle without using complicated additional equipment such as goniometric platforms on which to rest the wheels of the automobile frame.

Nor is it possible to measure the transverse or longitudinal wheel offset.

The aforesaid limitations result in practice not only in the impossibility of knowing the corrections to be made to the measured attitude angles, but also in the impossibility of checking correct steering behaviour at the various steering angles.

SUMMARY OF THE INVENTION

The object of the present invention is to provide an improved device to be applied to the wheels of an automobile frame which enables wheel position data to be measured which, after processing, provides not only significant attitude data but also the wheel track and the extent of certain geometrical wheel rim defects, and also allows the variation in certain attitude data such as convergence and camber with varying steering angle to be extrapolated.

This object is attained by a system comprising four identical measurement devices to be fixed in mutually symmetrical arrangement to the wheels of the automobile frame in such a manner as to interact with the devices positioned on the adjacent wheels, each device comprising two identical measurement units positioned in mutually perpendicular vertical planes and each comprising angle measurement means said angle measurement means of each unit comprising a reader in the form of a horizontal line of optical sensors which receives a first vertical light plane into which the horizontal light beam fed by the first projector of the cooperating measurement device arranged on the adjacent wheel is concentrated by a first cylindrical lens; a first projector to feed a horizontal light beam back to said cooperating measurement device; a second projector to feed a vertical light beam to a second cylindrical lens which concentrates it into a second vertical light plane; and a container for a liquid of high refractive power through which the second vertical light plane is refracted onto said reader.

The particular characteristics of the device are specified in the claims.

BRIEF DESCRIPTION OF THE DRAWINGS

For a better understanding of the invention, a preferred embodiment thereof is described hereinafter by way of non-limiting example and illustrated on the accompanying drawings.

FIGS. 2A, 2B and 2C show the orthogonal projections of the left front wheel of the automobile frame.

FIG. 3 is a front view of a device according to the invention.

DETAILED DESCRIPTION OF THE INVENTION

Figure 1:
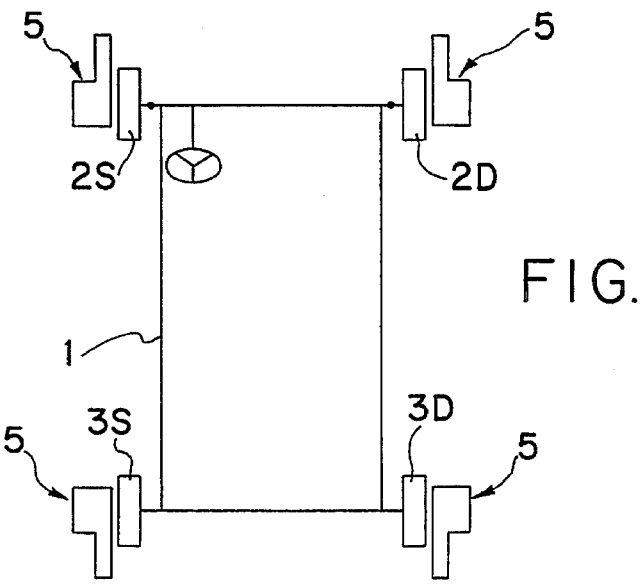
FIG. 1 is a schematic view of an automobile frame with two steered wheels, and with the devices of the invention applied.

The figures show an automobile frame 1 provided with steered front wheels 2D and 2S and non-steered rear wheels 3D and 3S.

A measurement device according to the invention is applied to each wheel by a known bracket 4. The devices 5 are all identical and are better illustrated in FIGS. 3, 4 and 5.

They comprise a plate 52 provided with a hole 50 to be mounted on the pin 40 rigid with the known bracket 4 for fixing the device to the wheel, and an upper screw 51 which makes contact with the pin 40 to prevent any oscillation of the device 5 relative to the bracket 4.

Each device 5 is arranged to form a pair with identical cooperating devices mounted on the adjacent wheels and is positioned symmetrically with these devices, it comprising first and second internal measurement units positioned at 90 degrees to each other.

Each unit 6 (see FIG. 4) consists of an outer casing 600 on which there is mounted an LED (light emitting diode) or first projector 601, to feed a light beam to that unit 6 arranged symmetrically on tile adjacent wheel.

Below the LED 601 there is a chamber 602 which receives the light beam emitted by the LED 601 of that unit 6 arranged symmetrically on the adjacent wheel.

Said light beam firstly encounters a parallel-faced transparent plate 603 of glass, polycarbonate or like material, positioned inclined to the axis of the chamber 602.

The purpose of the plate 603, in addition to protecting from dust, is to reflect or refract those rays of the light beam which are too displaced in direction and position from the axis of the chamber 602.

This latter comprises a convergent-walled portion 604 which reflects and outwardly expels those rays of the light beam which have passed beyond the plate 603 but which are inclined beyond a certain extent from the axis of the chamber 602.

Figure 4:
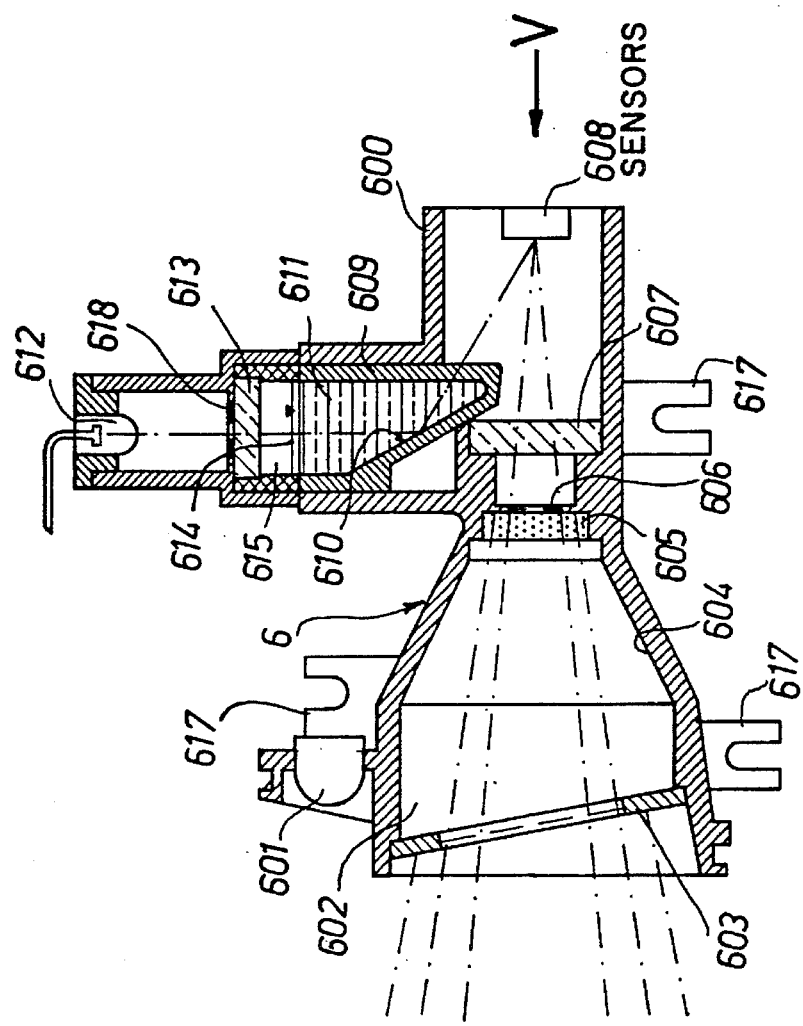
FIG. 4 is a section through the measurement means of the device of FIG. 3.

At the end of the convergent portion 604 there are positioned in succession a filter 605, a diaphragm 606 and a cylindrical lens 607, which in FIG. 4 is arranged with its axis vertical.

The purpose of said lens 607 is to concentrate the light beam into a light plane coinciding with the plane of FIG. 4 and striking the horizontal line 608 of optical sensors of CCD (charge-coupled device) type.

Said line of sensors 608 reads the position of incidence of the light plane, which is displaced from the centre of the line by a distance proportional to the angle of incidence of the light beam to the axis of the chamber 602.

The perpendicularity between the light plane and the sensor line ensures that these intersect at a point which remains the same whatever the difference in level between the emitting LED 601 and the receiving device 6.

Each unit 6 also comprises, in a position approximately overlying the lens 607, a vessel 609 of square or rectangular cross-section having an inclined reflecting wall 610, and with at least the opposite wall transparent, The vessel 609 contains a liquid 611 of high refractive power.

Above the vessel 609 there is an LED (light emitting diode) or second projector 612 which via a diaphragm 618 illuminates a cylindrical lens 613, the axis of which is parallel to the plane of FIG. 4.

The purpose of the lens 613 is to concentrate the rays of the light beam emitted by the second projector 612 into a light plane 615 parallel to the axis of the lens 613.

When the unit 6 shown in FIG. 4 is perfectly vertical, or rather when it is applied to a wheel having the diametrical plane of its rim perfectly vertical, the upper surface 614 of the liquid 611 is perfectly horizontal and perpendicular to the light plane 615.

This latter then passes through the liquid 611 without undergoing refraction, to strike, after reflection by the wall 610, the centre of the line of sensors 608 which is positioned perpendicular thereto.

Figure 5:
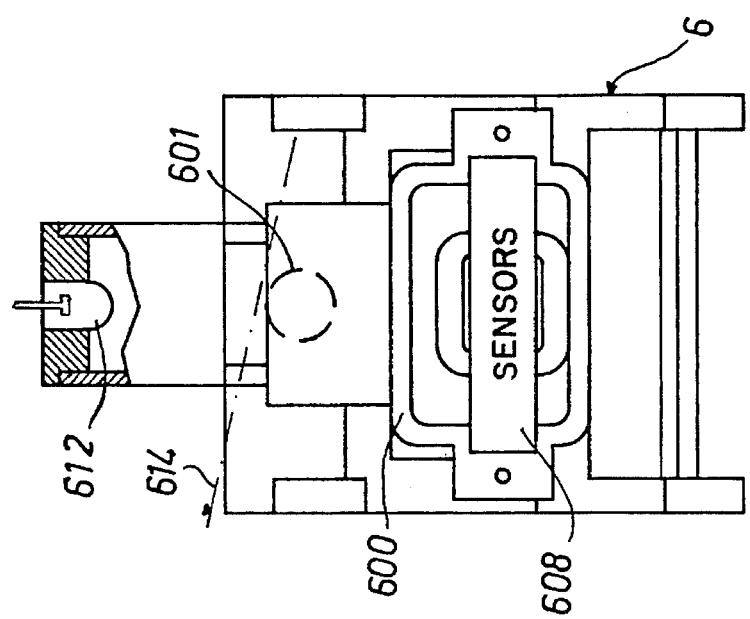
FIG. 5 is a view in the direction V indicated in FIG. 4.

When however the diametrical plane of the wheel is displaced from the vertical, the liquid surface 614 inclines as shown by the dashed line in FIG. 5, and the light plane strikes the line 608 in a position removed from the centre by a distance proportional to the angle of inclination of the wheel diametrical plane to the vertical.

With reference to FIG. 3, each device 5 comprises a baseplate 52 comprising the already stated hole 50 for mounting on the pin 40 forming part of the bracket 4 for fixing the device to the wheel.

Below the hole 50 the plate comprises, on one side, bosses 53 comprising a threaded hole, against which the lugs 617 of a unit 6 are fixed.

On the opposite side, to face the bracket 4, the plate 52 comprises two projecting parallel guides 54 between which there is supported a prismatic bar 55 which can be fixed to project, in two symmetrical positions, from one side or from the opposite side of the plate 52.

To the free end of the bar 55 there is fixed a unit 6 positioned horizontally in a direction perpendicular to the unit fixed to the plate 52. The two units 6 of each device 5 are arranged to interact with the units arranged symmetrically on the adjacent devices 5 in accordance with the scheme of FIG. 1. The signals collected by the lines of sensors 608 are firstly processed in each unit 6 by a microprocessor 616 which converts them from electrical signals to digital numbers, which are then converted into angular values using the calibration data.

The microprocessors 616 feed the thus converted signals to a central microprocessor 7 connected to a system suitable for controlling a (video) screen 8.

For a better understanding of the ensuing description a symbol will be attributed to each of the readings effected by the lines of sensors 608 on the basis of their point of application and the type of signal sensed.

For each unit 6, the individual line 608 reads:

the signal relative to the horizontal light beam originating from the LED 601 of the unit 6 located on one of the two adjacent wheels, which will be indicated by the prefix H;

the signal relative to the vertical light beam emitted by its own LED 612, which will be indicated by the prefix V;

the suffixes AD, AS, PD and PS indicate respectively the signals relative to the positions of the front right, front left, rear right and rear left wheels;

the further suffixes L and T indicate the longitudinal or transverse direction, referred to the vehicle axis, of the light beams which originate the signals.

For example H5ADL indicates the significant signal relative to the longitudinal light beam received by that unit 6 mounted in the longitudinal direction on the device 5 located on the front right wheel.

Likewise H5ADT indicates the significant signal relative to the transverse light beam received by that unit 6 mounted in the transverse direction on the device 5 located on the front right wheel; V5ADT indicates the signal relative to the vertical light beam received by that unit 6 mounted in the transverse direction on the device 5 located on the front right wheel; V5ADL indicates the signal relative to the vertical light beam received by that unit 6 mounted in the longitudinal direction on the front right wheel; and so on.

The system operates as follows.

Figure 2:
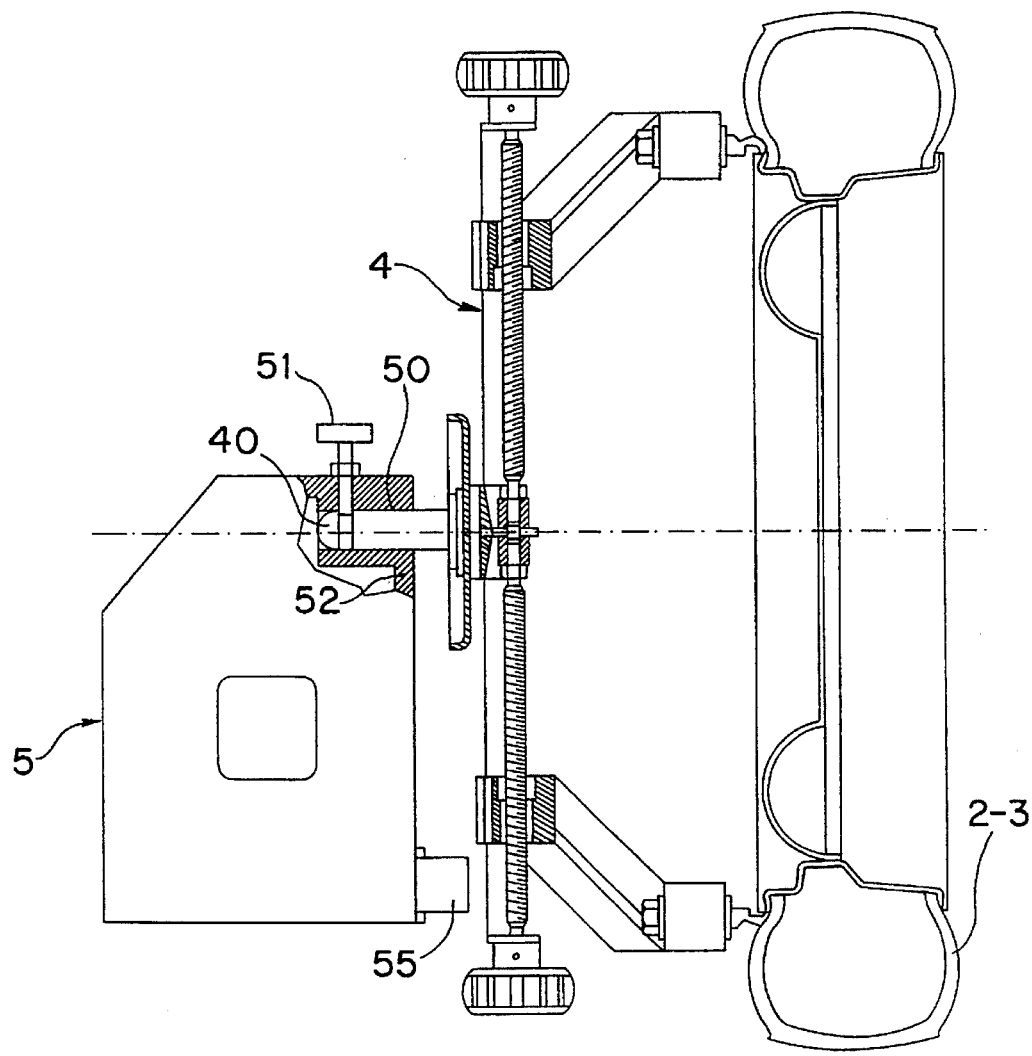
FIG. 2 is a partly sectional view of one of the wheels of the automobile frame with a device according to the invention applied.

The devices 5 are firstly positioned on the four wheels as indicated in FIGS. 1 and 2.

The perpendicularity defect between the diametrical plane of the front wheels and their axis of rotation is then measured through 360 degrees. If the diametrical plane of the wheel rim is not perpendicular to the wheel axis of rotation, the wheel wobbles, ie any point on the rim oscillates between two parallel planes on rotating. For each wheel this defect is representable by a sine curve representing the amplitude of the values V5 . . . L and/or H5 . . . L for each angular position of the wheel, as determined by an encoder.

The read values are mutually comparable but with a 90° rotation. Mean values can therefore be taken and that sine curve constructed which best approximates the read data, so annulling all errors due to data spread.

The values are then stored in the central microprocessor 7, and are used for correction purposes in calculating the convergence angles.

The misalignment between the wheel geometrical axis and its axis of rotation, assumed parallel, is then determined, this defect being responsible for jolting.

Misalignment is also a sinusoidal function of the wheel angular position, and is represented by the values H5 . . . . T for a complete wheel revolution, these influencing the convergence angle calculation. By subtracting the wobbling value the off-centre value can also be obtained.

A horizontality check is then made for each device 5 by rotating it on the pin 40 and locking it in position by the screw 51.

Visual verification of horizontality is obtained when the readings V5ADT, V5PDT and V5PST are all zero.

The total convergence and semiconvergence values for each axle are also provided by the central microprocessor 7 on the video screen 8, obtaining them from the following calculations, corrected on the basis of the aforesaid determined defects:

left front semiconvergence: (H5AST+H5ADT+H5ASL–H5ADL)/2 right front semiconvergence: (H5AST+H5ADT+H5ADL–H5ASL)/2 left rear semiconvergence: (H5PST+H5PDT+H5PSL–H5PDL)/2 right rear semiconvergence: (H5PST+H5PDT+H5PDL–H5PSL)/2 total front convergence: H5AST+H5ADT total rear convergence: H5PST+H5PDT front wheel misalignment: (H5AST+H5ADL–H5ASL–H5ADT)/2 rear wheel misalignment: (H5PST+H5PDL–H5PSL–H5PDT)/2 thrust angle: (H5PSL–H5PDL)/2 front wheel track variation: (H5AST+H5ADT–H5ADL–H5ASL)/2 rear wheel track variation: (H5PST+H5PDT–H5PSL–H5PDL)/2, these latter two values being equal.

The microprocessor 7 is able to check that the system calibration is correct at all times by verifying the following equation:

H5AST+H5PST+H5PDT+H5ADT–H5ASL–H5PSL–H5PDL–H5ADL=0.

It will be noted that in the various calculation algorithms the system according to the invention never uses signals from more than four units 6.

Because of the particular form of the devices 5 each using two units 6, further advantages unattainable with conventional devices are obtained.

The higher sensitivity of the lines 608 of CCD-type sensors and the greater definition made possible by the diaphragm 606 means that the distance between two devices 5 can be increased to 12 meters, against a maximum of about a third in the case of known devices, and the emitted signal is received sharply even with an inclination close to 25°, against the 10° previously achievable with optical systems.

The use of CCD-type sensors enables an LED-emitted signal wavelength of 950 nm to be used, at which visible light radiation is absorbed by the atmosphere up to 90% of the visible range. The signal hence reaches the sensors practically free from atmospheric noise.

The ability to effect sharp and precise measurements of the convergence angles of the steered wheels when these are steered through ± 20 degrees in one or other direction enables the angle differences during steering, on which road holding along curves depends, to be measured with an accuracy 1.66 times greater than that possible using ± 10 degree steering.

The same is true for measuring the angles of incidence and inclination of the kingpin, forming the steering axis of the steered wheels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A system for measuring the characteristic attitude angles of the wheel of an automobile frame, comprising:

four identical measurement devices fixed in mutually symmetrical arrangement to the wheels of the automobile frame to form a pair with identical devices mounted on adjacent wheels;

each measurement device comprising first and second identical measurement units positioned in mutually perpendicular vertical planes;

wherein each measurement unit comprises angle measurement means composed of a reader in the form of a horizontal line of optical sensors, a first cylindrical lens, concentrating into a first vertical light plane, the horizontal light beam arriving from the cooperating measurement device arranged on the adjacent wheel, a first projector for feeding a horizontal light beam back to said cooperating measurement device, a second projector for feeding a vertical light beam to a second cylindrical lens which concentrates it into a second vertical light plane, and a container of liquid of high refractive power through which the second vertical light plane is refracted onto said reader.

2. A system as claimed in claim 1, wherein said container has a reflecting side wall inclined to the axis of the second projector, with the opposite wall transparent.

3. The system according to claim 1, wherein the optical sensors are charge-coupled device sensors.

* * * * *